(12) United States Patent
Mohr et al.

(10) Patent No.: US 9,013,578 B2
(45) Date of Patent: Apr. 21, 2015

(54) VIDEO IMAGE PRESENTATION SYSTEM

(75) Inventors: Ulrich Mohr, Karlsruhe (DE); Andreas Stiegler, Waldbronn (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1258 days.

(21) Appl. No.: 11/941,643

(22) Filed: Nov. 16, 2007

(65) Prior Publication Data

US 2008/0239078 A1 Oct. 2, 2008

(30) Foreign Application Priority Data

Nov. 21, 2006 (EP) .................................... 06024147

(51) Int. Cl.
  *G06K 9/00* (2006.01)
  *G06T 7/00* (2006.01)
  *G06T 11/60* (2006.01)
  *G06T 19/00* (2011.01)

(52) U.S. Cl.
  CPC ............... *G06T 7/0042* (2013.01); *G06T 11/60* (2013.01); *G06T 19/006* (2013.01); *G06T 2207/30248* (2013.01); *G06K 9/00805* (2013.01)

(58) Field of Classification Search
  CPC ... B60R 21/0134; B60R 21/013; G01S 17/89; G01S 13/93; G01S 13/931; G01S 13/9357
  USPC ............ 701/49, 45, 301, 93, 36, 33, 96, 532, 701/29.7; 382/104, 100, 103; 250/221, 250/208.1; 348/148, 135, 143; 340/425.5; 702/143
  See application file for complete search history.

(56) References Cited

U.S. PATENT DOCUMENTS

| 5,963,148 | A | * | 10/1999 | Sekine et al. | ................. 340/905 |
| 2004/0148057 | A1 | * | 7/2004 | Breed et al. | ................... 700/242 |
| 2005/0259033 | A1 | * | 11/2005 | Levine | ............................... 345/7 |
| 2005/0273218 | A1 | * | 12/2005 | Breed et al. | ..................... 701/2 |

OTHER PUBLICATIONS

Segawa, et al.; Preceding Vehicle Detection Using Stereo Images and Non-scanning Millimeter-Wave Radar; IEICE Trans. Inf. & Syst., vol. E89-D, No. 7 Jul. 2006; pp. 2101-2108.

Retscher, et al.; Ubiquitous Positioning Technologies for Modern Intelligent Navigation Systems; The Journal of Navigation; 2006; vol. 59, pp. 91-103.

* cited by examiner

*Primary Examiner* — Waseem Ashraf
*Assistant Examiner* — Charles Murphy
(74) *Attorney, Agent, or Firm* — O'Shea Getz P.C.

(57) ABSTRACT

A system for presenting video images from a vehicle environment includes taking video images of the vehicle environment, detecting sensor data of the vehicle environment or the vehicle, processing the sensor data, recognizing objects in the video images, and visualizing the processed sensor data in the displayed video images by changing the representation of recognized objects in the displayed video images.

30 Claims, 6 Drawing Sheets

VIDEO IMAGE PRESENTATION SYSTEM

RELATED APPLICATIONS

This application claims priority of European Patent Application Serial Number 06 024 147.8, filed on Nov. 21, 2006, titled METHOD AND SYSTEM FOR PRESENTING VIDEO IMAGES, which application is incorporated in its entirety by reference in this application.

BACKGROUND OF THE INVENTION

1. Field of the Invention

This invention relates a system for presenting video images from a vehicle environment. In one particular aspect, the invention relates to driver assist systems in which an image sensor, such as a camera, provided in the vehicle takes video images from the vehicle environment, and in which objects in the video images are enhanced or elements are added so as to communicate information to the driver in response to detected sensor data.

2. Related Art

Vehicle-based navigation systems are known that guide the driver of the vehicle from the present location to a predetermined destination. The navigation system may output driving indications either visually by indicating the driving direction on a display or orally by a voice output indicating the next driving maneuver. Additionally, systems are known that are utilized in connection with driver assist systems in which artificial elements such as speed limits or distance markers are introduced into the video images captured by a video camera. These elements are shown floating on the video image. The introduced elements, however, are not coupled or only loosely coupled to the real situation.

Artificially introduced elements such as speed limits in an area where the speed limit applies may assist the driver during navigation when he or she is able to understand the abstraction generated by introducing an artificial element into a video image of the vehicle environment. Thus, known uses of artificially introduced elements have required the driver to become accustomed to this abstract visualization of data. Moreover, in these examples, the displayed images differ from what the driver actually sees in front of the vehicle.

Additionally, many different sensors may be provided in a vehicle. These sensors may detect either a physical value of the vehicle environment outside the vehicle or any other physical values of the vehicle such as the vehicle speed. In certain driving situations, it would be helpful to visualize the physical values detected by the sensors in the video image in such a way that the driver can recognize the situation faster and more easily.

Accordingly, a need exists to provide a system for enabling the driver to recognize the information provided by a vehicle sensor more quickly and easily.

SUMMARY

According to one implementation, a system is provided for displaying video images from a vehicle environment. The system includes an image sensor taking video images from the environment of the vehicle, at least one sensor detecting data of the vehicle environment or the vehicle itself, a sensor processing unit processing the sensor data, an image processing unit post-processing the video images and recognizing objects in the video images, and a graphics processing unit visualizing the processed sensor data in the displayed video images by changing the representation of recognized objects in the displayed video images.

According to another implementation, a system is provided for displaying video images from a vehicle environment outside of a detecting vehicle. The system includes an image sensor taking video images from the vehicle environment, at least one velocity sensor detecting the velocity of other vehicles in the vehicle environment, a velocity sensor processing unit processing the velocity of the other vehicles, an image processing unit post-processing the video images and recognizing the other vehicles in the video images, and a graphics processing unit visualizing the processed sensor data in the displayed video images. When the velocity sensor detects that the velocity of a vehicle moving in front of the detecting vehicle is lower than a predetermined threshold velocity, the graphics processor displays braking lights of the front vehicle in an activated state.

According to another implementation, a system is provided for displaying video images from a vehicle environment outside of a detecting vehicle. The system includes an image sensor taking video images from the vehicle environment, at least one velocity sensor detecting the velocity of other vehicles in the vehicle environment, a velocity sensor processing unit processing the velocity of the other vehicles, an image processing unit post-processing the video images and recognizing the other vehicles in the video images, and a graphics processing unit visualizing the processed sensor data in the displayed video images. When the velocity sensor detects that the velocity of a vehicle moving in front of the detecting vehicle is lower than a predetermined threshold velocity, the graphics processor adds flashing warning lights to the front vehicle in the displayed video images.

According to one implementation, a method is provided for presenting video images from a vehicle environment outside of a detecting vehicle. The method includes taking video images of the vehicle environment, detecting sensor data of the vehicle environment or the detecting vehicle itself, processing the sensor data, recognizing objects in the video images, and visualizing the processed sensor data in the displayed video images by changing the representation of recognized objects in the displayed video images.

According to another implementation, a method is provided for presenting video images from a vehicle environment outside of a detecting vehicle. The method includes taking video images of the vehicle environment, recognizing objects in the video images, such as a vehicle in front of the detecting vehicle, detecting sensor data, such as determining the velocity of the recognized vehicle, processing the sensor data, and visualizing the sensor data in the displayed video images. In the case where the recognized object is a vehicle, visualizing the sensor data, when the sensor data is the velocity of the recognized vehicle may include changing the representation of the recognized vehicle in the displayed video images. For example, when it is detected that the velocity of the recognized vehicle is lower than a predetermined threshold velocity, braking lights of the recognized vehicle may be shown in the video images in an activated state. In another example, visualizing the sensor data may include adding flashing warning lights to the recognized vehicle as shown in the video images, when it is detected that the velocity is lower than a predetermined threshold velocity.

According to another implementation, a method is provided for presenting video images from a vehicle environment outside of a detecting vehicle to a driver of the detecting vehicle. The method includes taking a video image of the vehicle environment, recognizing a plurality of objects in the video image, presenting the video image including the recognized objects on a display of the detecting vehicle, detecting sensor data of the vehicle environment or the detecting vehicle itself by operating a sensor of detecting vehicle and, based on the detected sensor data, determining whether one or more of the detected sensor data is to be selected for communication to the driver via the presented video image. If it is determined that one or more of detected sensor data is to be selected for communication to the driver, the representation of one or more of the recognized objects in the presented video image is changed so as to visualize the selected sensor data.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
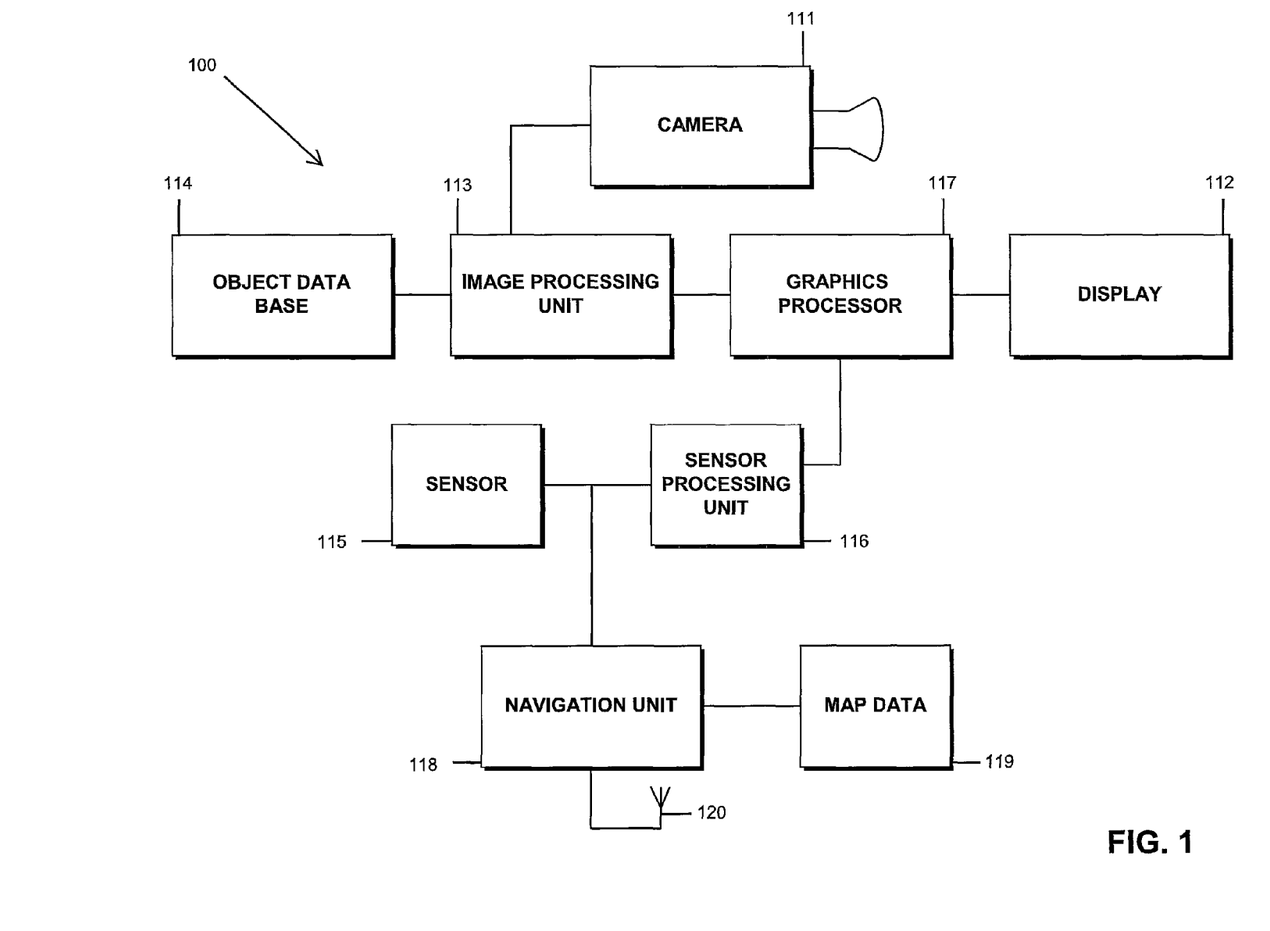
FIG. 1 is a schematic view of an example of a system for displaying video images in which a sensor information is visualized by changing the representation of objects in the displayed video images.

FIG. 1 illustrates a system 100 that may be utilized for visualizing sensor information in a video image presented to the driver of a vehicle. The system 100 shown in FIG. 1 includes a camera or other type of image sensor 111 configured to take images from an environment external to the vehicle. The camera 111 may be part of a travel assist system in which the images from the camera 111 are displayed to the driver on a display 112. The camera 111 is installed in a vehicle (not shown). The camera 111 may, for example, be positioned behind the windscreen or windshield to supervise the environment situated in front of the vehicle. Furthermore, it is possible to install the camera 111 in the front part of the vehicle, e.g. next to the radiator grill. The camera 111 may, for example be a CCD camera or CMOS camera taking images at a frame rate from, for example, about 20 to about 100 frames (images per second), or in another example between 25 and 100 frames. These frame rates are necessary to be sure to grasp the scenery early enough when the vehicle is driving at high speed. The camera 111 provides a two-dimensional representation of the vehicle environment in front of the vehicle. It should be understood that it is also possible to locate the camera 111 in such a way that the rear part of the vehicle is supervised when the vehicle is driving in the rearward direction, one example being a parking assist situation. Furthermore, two or more cameras 111 may be provided. For example, one camera 111 may monitor the environment in front of the vehicle and another camera 111 may monitor the back environment of the vehicle.

An image processing unit 113 may be connected to the camera 111 to receive the video images from the camera 111. The image processing unit 113 post-processes the received images to detect/locate objects in the video images such as other vehicles or persons or any other element present in the video-captured environment of the vehicle. Object identification may be carried out by any suitable technique, e.g., by implementing pattern recognition, applying filters to the received image data, etc. By way of example, the object detection can be carried out by utilizing edge detection filters that detect intensity differences in neighboring pixels of the images. When the contour or shape of an object is found, this contour may be compared to different predetermined contours stored in an object database 114. This may entail, for instance, classifying the detected object as being part of one of a plurality of different object classes for which information is stored in the system. For example, different object classes may exist for vehicles, buildings, motorcycles, pedestrians, trees, etc. By comparing the shape detected in the video images to predefined shapes, the object in the image may be recognized. By way of example, when the vehicle that includes the camera 111, or the "detecting vehicle," drives behind another vehicle, this other vehicle in front of the detecting vehicle can be detected by the image processing unit 113. The detected contours may then be compared to the object database 114 and by that comparison the contour may be identified as being a vehicle. This identification of the objects in the video images may be utilized for the visualization of the sensor data as will be explained in detail below.

The system 100 may further include a sensor 115 detecting sensor data from either outside the vehicle, i.e. from the vehicle environment, or from the vehicle itself. It should be understood that several sensors 115 may be provided in the vehicle, but for the sake of clarity only one sensor 115 is indicated in the example shown in FIG. 1. This sensor 115 may provide information about the actual speed of the detecting vehicle. Additionally, a distance sensor 115 may be provided that measures the distance to the vehicles or other objects in front of the detecting vehicle taking into account the driving direction of the detecting vehicle. Other types of sensors 115 may be provided as described below. The sensor data are transmitted to a sensor processing unit 116 processing the sensor data. The processed sensor data, such as the actual vehicle speed of the detecting vehicle, the distance of the vehicle driving in front of the detecting vehicle, the velocity of the vehicle in front (absolute velocity, or relative to the detecting vehicle), or other types of data are then transmitted to a processing unit 117. The processing unit 117 may also be responsible for processing the graphics and preparing the image data to be displayed on the display 112. Accordingly, in the example shown in FIG. 1, the processing unit 117 is indicated as being a graphics processor.

The system 100 may further include a navigation unit 118 capable of informing a user of how to reach a predetermined destination. The navigation unit 118 may calculate the fastest or shortest routes from the present location to a predetermined destination based on map data 119 provided in the navigation system. Additionally, an antenna 120 may be provided for receiving signals from a satellite system. The navigation unit 118 may be configured to determine the present vehicle position based on the signals received from the antenna 120.

The information of the sensor or sensors 115 may be presented to the driver in different ways. In a case where the sensor 115 is a distance measuring sensor measuring the distance to the objects in front of the detecting vehicle, this distance may be indicated to the driver by simply displaying a distance value. However, this abstract figure may not be useful to the driver as the driver may not know how to react on the presented figures. According to the teachings of the invention, it is possible to visualize the information received from the sensor data in the displayed video images. In one implementation, this may be done by introducing additional elements to objects already present in the scenery (and being displayed in the video image) that are not actually in the scene, but which could be there in another traffic situation. Different examples of the visualization of the processed sensor data are given in connection with FIGS. 3-6.

Figure 2:
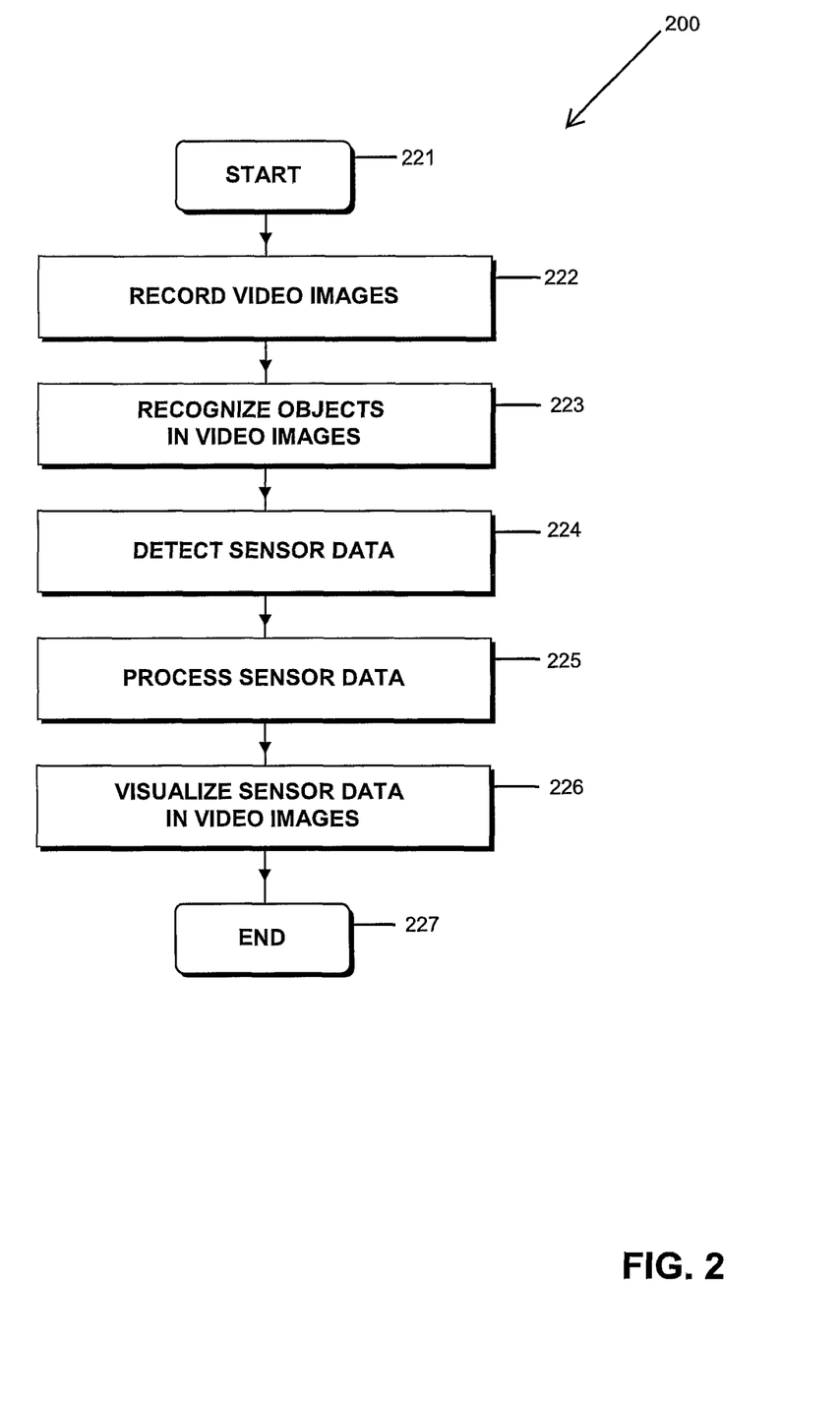
FIG. 2 is a flowchart illustrating steps of carrying out an example of a method for displaying the video images with the sensor information.

FIG. 2 is a flowchart 200 illustrating various steps that may be performed to visualize the sensor data in the video images according to one example. The method starts in step 221 and the video images are recorded in step 222. The recorded video images are then further processed to recognize objects shown in the video images. These objects may be, for example, other vehicles, pedestrians, buildings, trees, signs, or any other objects that could be hazardous to the vehicle or for which higher attention of the driver is necessary. The image processing unit 113 (FIG. 1) may then recognize the different objects to subsequently determine the objects for which the representation should be changed for visualizing the sensor information (step 223).

In step 224, the sensor data are detected, and in step 225 the detected sensor data are processed to retrieve the information which should be indicated to the driver. In step 226, the information received from the sensor data is visualized in the video images by changing the representation of objects that were detected in the video images so that the driver is informed in a very natural way of the information provided by the sensor 115 (FIG. 1). To this end, the sensor information may be translated into an image. The method may also entail determining which of the objects in the image the representation should be changed, as well as deciding in which way the representation should be changed. For example, as described below, the video image of the real traffic situation may be augmented with artificial (but natural- or native-appearing) elements of the objects for which the representation in the video image is to be changed. On the one hand this may mean that the way the representation is changed could be in fact present in the given situation. On the other hand this may mean that the object shown in the video images is represented in another way in view of the received sensor data. The method ends in step 227.

Figure 3:
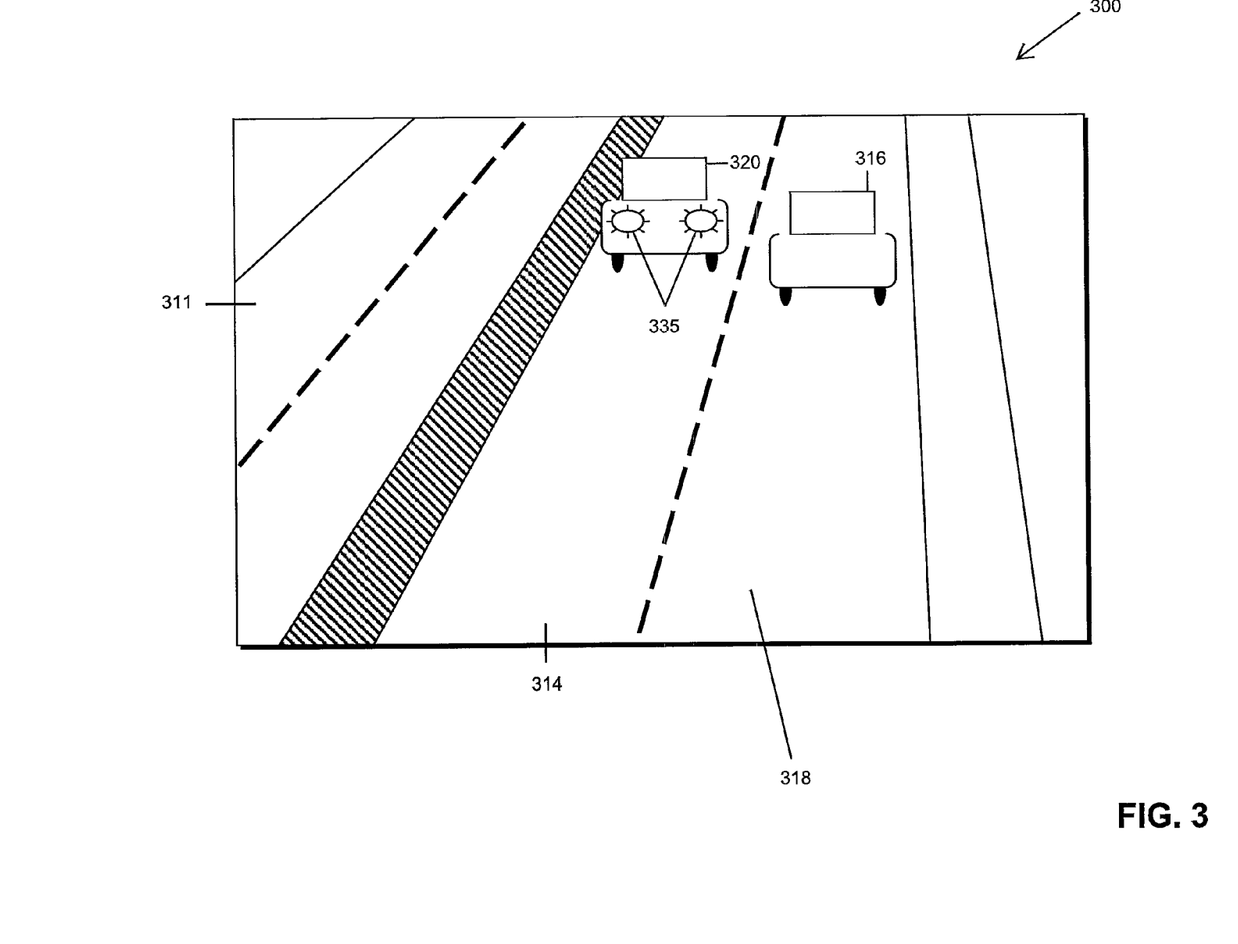
FIG. 3 is one example of a video image in which distance or velocity information is represented in the video image.

FIG. 3 illustrates, according to one implementation, an example of an image 300 of the camera 111 (FIG. 1) of the detecting vehicle when the detecting vehicle is driving on a highway 311 having two lanes for each direction. By way of example, the detecting vehicle is driving on the left lane 314, one vehicle 316 is driving on the right lane 318, and another vehicle 320 is driving on the left lane 314. These two vehicles 316 and 320 are also visible in the video images 300 taken by the camera 111. When the video images 300 are processed for detecting any object in the images 300, the contours of the vehicles 316 and 320 may be detected by the image processing unit 113. By comparing the detected shape with different reference shapes stored in the database 114, the image processing unit 113 may classify the two detected objects as vehicles 316 and 320. Additionally, the sensor 115 may be a distance sensor measuring the distance to the two vehicles 316 and 320 driving in front. It should be understood that the information of the distance may also be retrieved by processing the video images 300. When it is detected that the two objects 316 and 320 get larger in the video images 300 very fast, it can be followed that the distance to these two vehicles 316 and 320 is getting smaller. Furthermore, the camera 111 and the sensor 115 may be incorporated into one 3D imaging system that provides depth information in addition to the image 300. When the sensor 115 now detects that the vehicle 320 is much slower and the distance to this vehicle 320 is getting smaller and smaller, the graphics processor 117 may react on the information received from the sensor 115 in such a way by introducing new elements into the image 300. By way of example the graphical representation of the vehicle 320 may be changed by adding artificial brake lights 335 to the displayed image 300. When the image processing unit 113 has classified object 320 as a vehicle, the system may be configured in such a way that the brake lights 335 are added at a predetermined position of the geometrical shape of the vehicle 320, even if the lights 335 were not actually detected in the video images 300 of the vehicle 320. When the brake lights 335 are shown in an activated state, the driver of the vehicle 320 may have the impression that vehicle 320 activates the brake. Accordingly, the driver will pay more attention to the decreasing distance as it was detected by the distance sensor 115.

In another example, the sensor data may indicate that the vehicle 320 in front of the detecting vehicle is traveling at an absolute velocity, or a velocity relative to the detected vehicle, that is lower than a predetermined threshold value, which in turn indicates that the detecting vehicle is approaching the front vehicle 320. In this case, the representation of the front vehicle 320 that is being displayed to the driver in the video image 300 may be changed in a manner effective to alert the driver of the detecting vehicle of this situation, such as by adding highly-illuminated and/or blinking brake lights 335 or other warning signs to the video image 300 as described above.

The foregoing examples demonstrate that by introducing elements into the scene which were not present in the video images 300, but which could be there, the driver can be informed of sensor information without the need for abstraction. In the above-described examples, the front vehicle 320 is actually equipped with brake lights, but these brake lights may not actually be activated due for example to being faulty or simply because the front vehicle 320 is driving slower than the detecting vehicle such that the brakes are not actually being applied. By adding the brake lights 335 to the image 300 of the front vehicle 320 being displayed to the driver of the detecting vehicle, the driver can easily understand the information provided by the sensor 115 (FIG. 1)—which information, in the present example, relates to the condition of the front vehicle 320 driving slower than the detecting vehicle—thus facilitating the ability of the driver to react appropriately to the situation.

In connection with FIG. 3 another implementation of the invention can be explained. In another implementation, it may happen that the two vehicles 316 and 320 are the last two vehicles of a traffic congestion, the vehicles 316 and 320 moving very slowly or the vehicles 316 and 320 not moving at all. The sensor 115 (FIG. 1) detecting the distance or the velocity of the two vehicles 316 and 320 driving ahead now detects that these two vehicles 316 and 320 are actually not moving anymore and that the detecting vehicle is moving at a relatively high speed. To show to the driver that a hazardous situation may occur, the representation of the two vehicles 316 and 320 in the video images 300 may be changed in such a way that the two warning lights 335 are shown in a flashing state to signal that these two vehicles 316 and 320 are part of the rear end of a traffic congestion. Even if the drivers of the two vehicles 316 and 320 have not activated their warning lights, the driver of the detecting vehicle is informed in a manner easy to understand. Accordingly, the driver can react in a manner necessary to avoid a crash with the two vehicles 316 and 320 by actually actuating the brake.

In addition to the information received from a distance sensor 115, the information of a traffic congestion may also be received from the navigation system. Systems employing messages such as TMC messages (Traffic Message Channel) are known that are received in encoded form in the radio signal of a radio station. This traffic news may include the information on which part of a highway the traffic is congested. By comparing the actual vehicle position as determined in the navigation unit to the traffic news, it may be deduced that a traffic congestion may occur. This navigation-based information may be utilized either instead of or in combination with distance sensors or velocity measuring sensors. The decision whether to activate the warning lights 335 may also depend on the fact whether the vehicle is driving on a highway or not.

In an urban agglomeration, the detection of non-moving vehicles on the same lane as the detecting vehicle may be considered as being normal, e.g. when vehicles are waiting at a traffic light. On highways, however, the detection of non-moving vehicles on one of the lanes may be considered as being dangerous. Thus, in one implementation the system may be configured such that the flashing lights 335 are added to the non-moving vehicle only when the navigation system indicates that the vehicle is driving on a highway.

Thus, in some implementations, the representation of the recognized object in the image 300 may be changed depending on signals received from two different sensors, the position determination sensor and the velocity or distance sensor.

Figure 4:
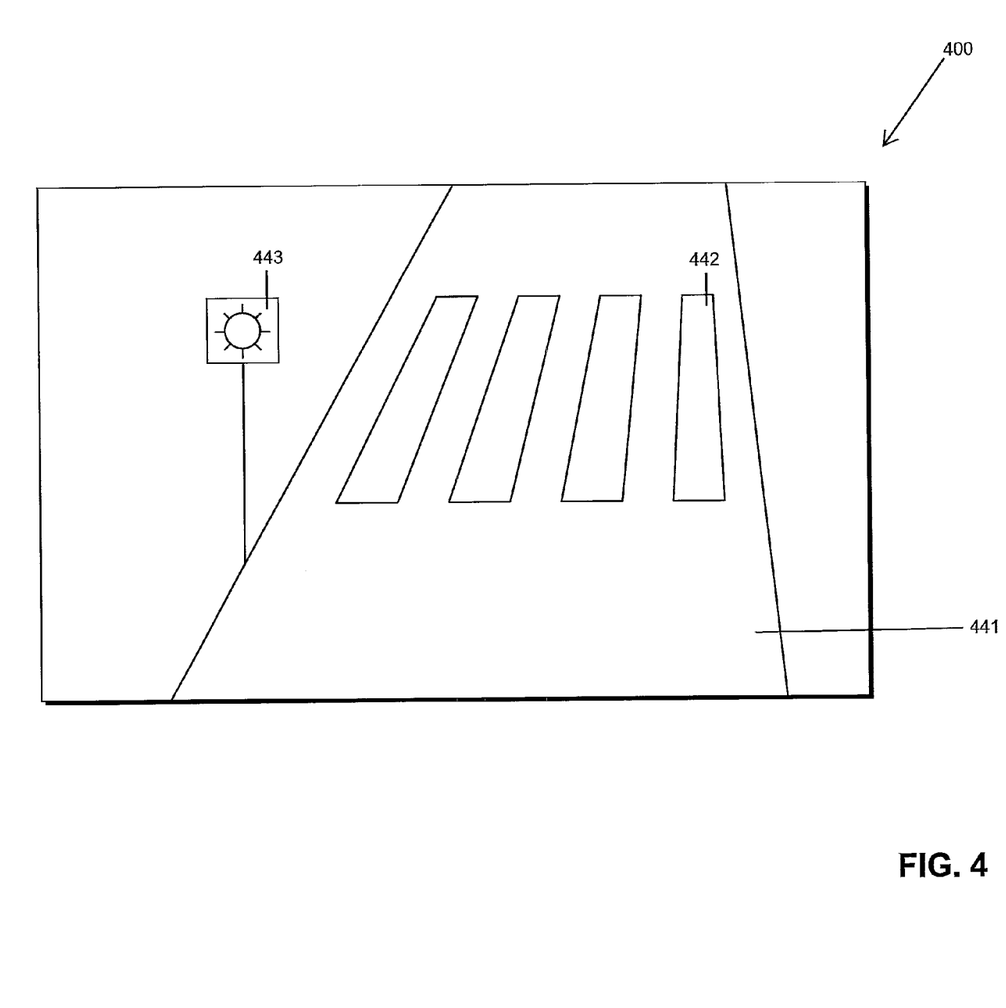
FIG. 4 is another example of the representation of sensor data in the video images.

FIG. 4 is an example of another video image 400 as recorded by the camera 111. In this example, the detecting vehicle is driving on a road 441 and is approaching a crosswalk 442. The system may now determine the actual vehicle speed of the detecting vehicle and the information may be received from the navigation unit 118 that the vehicle is approaching the shown crosswalk 442. When it is now detected that the vehicle is driving at a speed far too high for a situation in which the vehicle will approach the crosswalk 442, the video images 400 may be altered in such a way that a warning light 443, such as the type that may be present at crosswalks (e.g., a Belisha Beacon), is displayed as being activated. By activating the flashing lights 443, the driver can be informed that it may be advisable to lower the speed of the vehicle when the vehicle is approaching the crosswalk 442. Furthermore, it is possible to change the representation of the crosswalk 442 itself, such as by changing the color of the displayed crosswalk 442. Accordingly, this implementation is an example of the representation of an object itself being changed.

Figure 5:
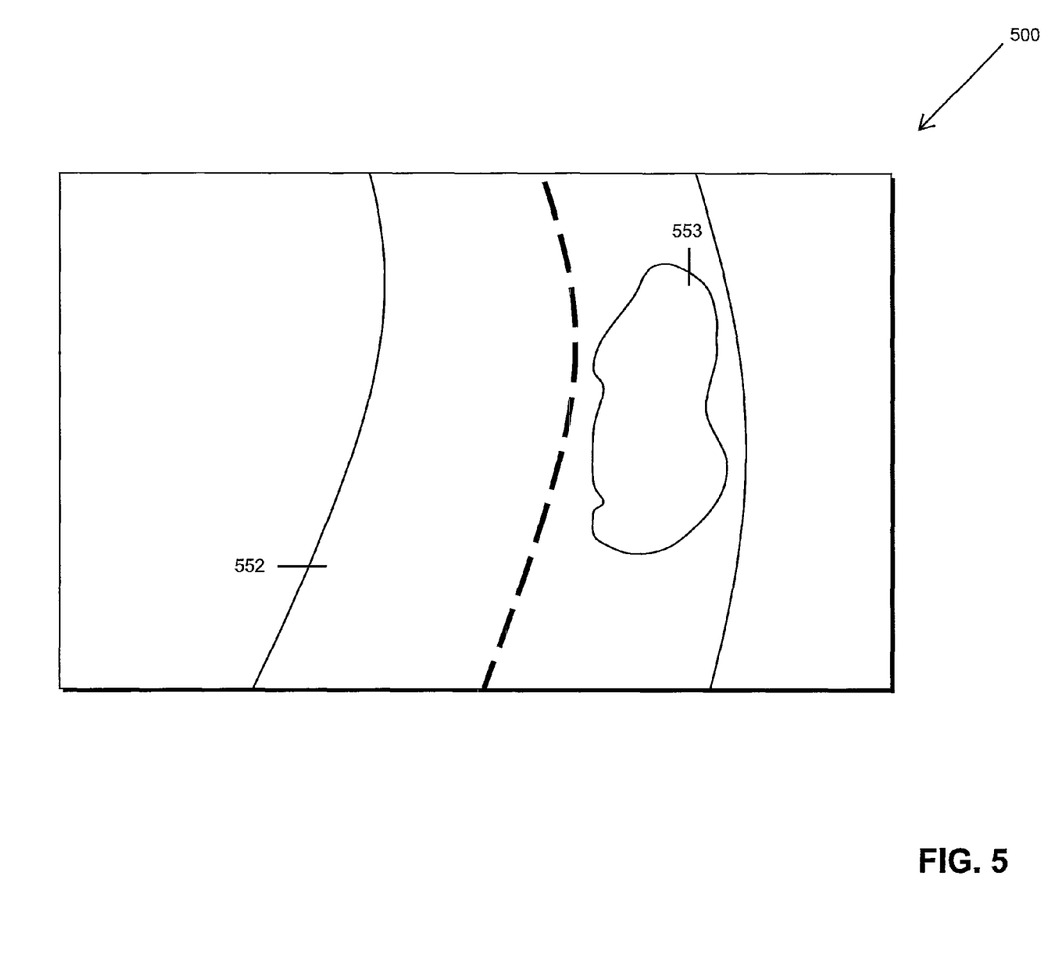
FIG. 5 is another example of a video image in which the information of a temperature sensor is displayed.

FIG. 5 is an example of another video image 500 as taken by the camera 111. The example shown in FIG. 5 may help the driver to recognize that the outside weather conditions are such that the risk of an icy or otherwise potentially hazardous road 552 exists. By way of example, a temperature sensor may measure the outside temperature. If the outside temperature is close to or below 0° C. and an additional sensor measures the moisture level, the sensor processing unit 116 may process the sensor data and determine whether the moisture level is higher than a predetermined moisture threshold value. If this is the case, and the temperature is lower than a predetermined threshold temperature, it would be advantageous to indicate to the driver that the road 552 may be slippery. To inform the driver of the weather conditions, the shown video images 500 may be changed in such a way that in the images 500 the road 552 is indicated as having reflections 553 similar to ice, water or the like. When such reflections 553 are shown on the road 552, the reflections 553 may be displayed in the video images 500 to indicate to the driver that a danger of an icy road 552 or a similar dangerous condition may exist.

In another example of an implementation of the invention, the sensor data detecting the outside visibility are processed and when the visibility is lower than a predetermined threshold visibility and when the distance to the vehicle in front of the detecting vehicle is larger than a predetermined distance, the representation of the vehicle in front can be changed. In foggy situations, distance sensors, such as radars or infrared sensors, can detect objects at greater distances and in situations in which the driver may not clearly recognize the vehicle in front. Using the additional distance sensors in the detecting vehicle, the video images can be augmented with an image of the vehicle in front at the actual position. Accordingly, the vehicle in front may be rendered more visible than in reality as seen through the windshield.

Figure 6:
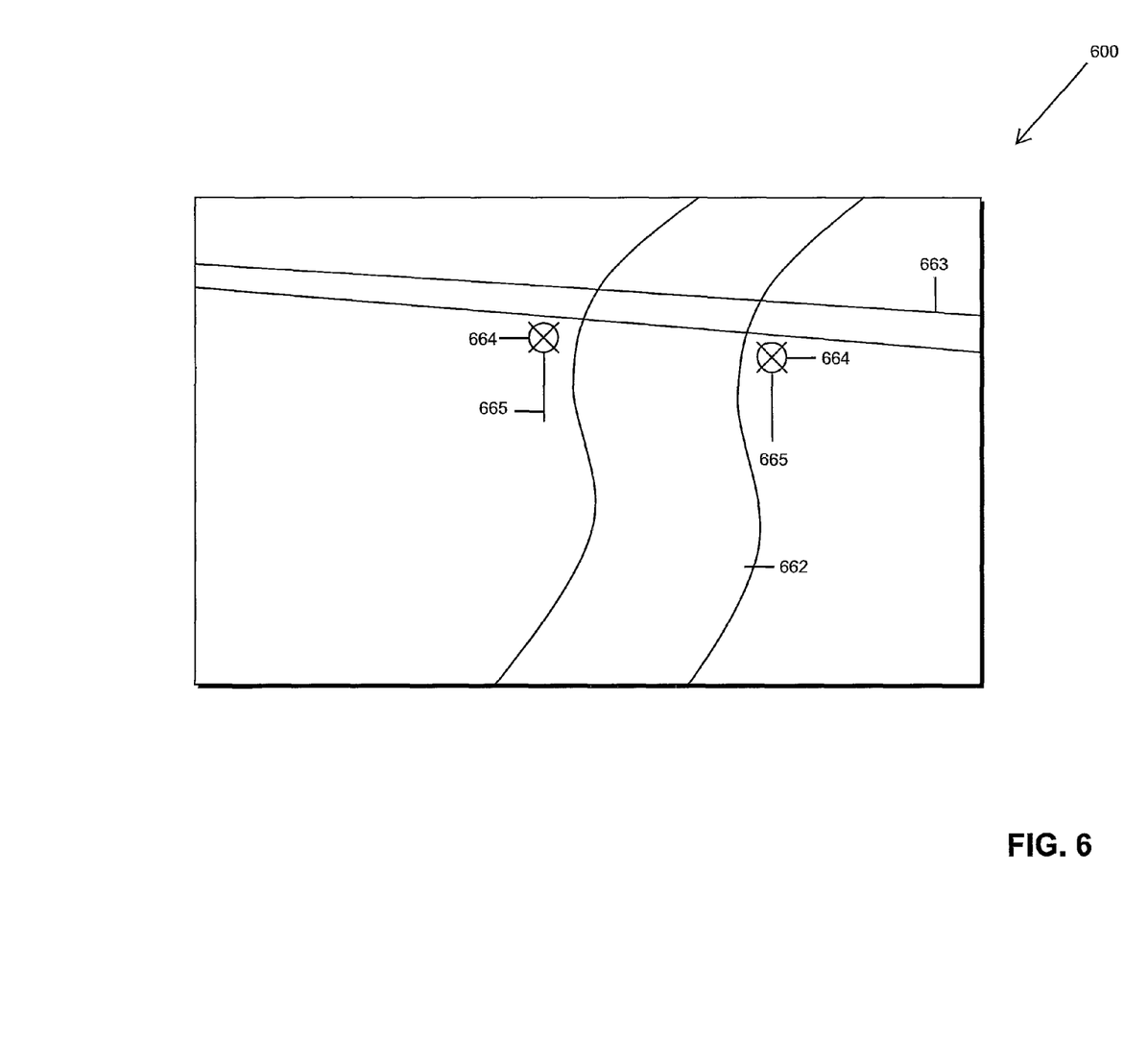
FIG. 6 is another example of visualizing the information of a navigation unit in the video images.

FIG. 6 is an example of another video image 600 as taken by the camera 111. In the example illustrated in FIG. 6, the vehicle is driving along a road 662 that is crossed by a railway 663. The system may now detect the vehicle speed of the detecting vehicle, and the map data of the navigation unit may indicate that the crossing of the railway 663 is coming up ahead. When it is now detected that the vehicle speed is much too high and as the possibility may exist that the crossing is closed when a train is approaching, the driver may be informed of this possible danger and the exaggerated velocity by introducing flashing lights 664 into a sign 665 indicating the crossing of the railroad 663. Through the flashing lights 664, the driver is informed that the actual vehicle speed may not be appropriate in view of the crossing railroad 663.

The above-mentioned implementations provide examples of how sensor information may be visualized in such a way that the driver can easily understand the information provided by the sensor. According to teachings of the invention, this visualization is obtained by introducing elements in the displayed video images that are not actually present in the video images, but which could be there in another situation. Using these native elements to augment the scene releases the driver from unnecessary abstraction and thus enables the driver to recognize the situation much faster.

It will be understood, and is appreciated by persons skilled in the art, that one or more processes, sub-processes, or process steps described in connection with FIGS. 1-6 may be performed by hardware and/or software. If the process is performed by software, the software may reside in software memory (not shown) in a suitable electronic processing component or system such as, one or more of the functional components or modules schematically depicted in FIG. 1. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" and/or "signal-bearing medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for presenting video images from a vehicle environment outside of a detecting vehicle, the method comprising:
    taking video images of the vehicle environment
    detecting sensor data of the vehicle environment or the detecting vehicle itself;
    processing the sensor data;
    determining the distance of an object shown in the video images relative to the detecting vehicle from where the distance is determined;
    recognizing objects in the video images; and
    visualizing the processed sensor data in the displayed video images by changing the representation of recognized objects in the video images,
    when it is detected that the distance of the object relative to the detecting vehicle is decreasing, changing the representation of the object in the displayed video image to visually alert a driver of the detecting vehicle of the object,
    where the representation of the recognized objects is changed by introducing an element in an object in the displayed video images, and where the element is not in the video images of the environment of the vehicle, and where the element is an element that could be present in another driving situation, where the element is a representation of a component of a detected object in the environment, and where the alert visually changes or modifies the element that is not present visibly or invisibly in the vehicle environment as viewed by a driver of the detecting vehicle.

2. The method of claim 1, where objects in the video images are detected and interpreted by post processing the video images and are classified in object classes.

3. The method of claim 1, where the representation of the recognized objects is changed by introducing an element in an object in the displayed video images, and where the element is actually not present in the vehicle environment as viewed by a driver of the detecting vehicle through a windscreen of the vehicle.

4. The method of claim 1, where the video images are taken from the vehicle environment in front of the detecting vehicle.

5. The method of claim 1, where the video images are taken from the vehicle environment in back of the detecting vehicle.

6. The method of claim 1, where the step of recognizing objects includes the step of recognizing vehicles in the video images.

7. The method of claim 1, where the step of detecting sensor data includes the step of determining the distance of an object shown in the video images relative to the detecting vehicle from where the distance is determined.

8. The method of claim 7 where, when it is detected that the distance of the object relative to the detecting vehicle is decreasing, changing the representation of the object in the displayed video image to visually alert a driver of the detecting vehicle of the object.

9. The method of claim 1, where the step of detecting sensor data includes the step of determining the velocity of a vehicle in front of the detecting vehicle.

10. The method of claim 9, where, when it is detected that the velocity of the vehicle in front of the detecting vehicle is lower than a predetermined threshold velocity, changing the representation of the front vehicle by emphasizing visualization of braking lights of the front vehicle in the displayed video images.

11. The method of claim 9, where, when it is detected that the velocity of the vehicle in front of the detecting vehicle is lower than a predetermined threshold velocity, changing the representation of the front vehicle by adding flashing warning lights to the front vehicle in the displayed video images.

12. The method of claim 1, where the step of detecting sensor data includes the step of determining the outside visibility, and when the visibility is lower than a predetermined threshold visibility and when the distance to the vehicle in front is greater than a predetermined distance, the representation of the vehicle in front of the detecting vehicle is changed.

13. The method of claim 1, where the step for detecting sensor data of the vehicle includes the step of determining the position of the vehicle and to locate the vehicle in a digital map and to emphasize objects in the video images depending on information from the map data.

14. The method of claim 13, where object information is retrieved from the map data, and the objects in the video images are emphasized depending on the received sensor data.

15. A system for displaying video images from a vehicle environment, the system comprising:
    an image sensor taking video images from the environment of the vehicle;
    at least one sensor detecting data of the vehicle environment or the vehicle itself;
    a sensor processing unit processing the sensor data;
    an image processing unit post-processing the video images and recognizing objects in the video images; and
    a graphics processing unit visualizing the processed sensor data in the displayed video images by changing the representation of recognized objects in the video images, when it is detected that the distance of the object relative to the detecting vehicle is decreasing, changing the representation of the object in the displayed video image to visually alert a driver of the detecting vehicle of the object, where the representation of the recognized objects is changed by introducing an element in an object in the displayed video images, and where the element is not in the video images of the environment of the vehicle, and where the element is an element that could be present in another driving situation, where the element is a representation of a component of a detected object in the environment, and where the alert visually changes or modifies the element that is not present visibly or invisibly in the vehicle environment as viewed by a driver of the detecting vehicle.

16. The system of claim 15, where the sensor detecting data of the vehicle environment is selected from the group consisting of a distance sensor, a sensor detecting the velocity of vehicles driving in front of the vehicle, and a position detecting sensor.

17. The system of claim 15, where the image processing unit recognizes objects in the video images by applying edge detection filters to the video images and comparing the detected objects to predetermined types of objects stored in a database.

18. A method for presenting video images from a vehicle environment outside of a detecting vehicle, the method comprising:

taking video images of the vehicle environment;
recognizing a vehicle in front of the detecting vehicle in the video images;
determining the velocity of the recognized vehicle;
processing the determined velocity; and
visualizing the processed velocity in the displayed video images by changing the representation of the recognized vehicle in the video images to visually alert the driver of the detecting vehicle, where, when it is detected that the velocity of the recognized vehicle is lower than a predetermined threshold velocity, braking lights of the recognized vehicle as shown in the video images are displayed in an activated state although not actually physically in the active state, where the activated brake lights could be present in another driving situation.

19. A method for presenting video images from a vehicle environment outside of a detecting vehicle, the method comprising:

taking video images of the vehicle environment;
recognizing a vehicle in front of the detecting vehicle in the video images;
determining the velocity of the recognized vehicle relative to the detecting vehicle;
processing the determined velocity; and
visualizing the processed velocity in the displayed video images by changing the representation of the recognized vehicle in the displayed video images to visually alert the driver of the detecting vehicle, where the representation of the recognized vehicle is changed in the video images by adding flashing warning lights to the recognized vehicle as shown in the video images, when it is detected that the velocity is lower than a predetermined threshold velocity although the flashing warning lights are not physically in an active state in the recognized vehicle, where the flashing warning lights could be present in another driving situation.

20. A system for displaying video images from a vehicle environment outside of a detecting vehicle, the system comprising:

an image sensor taking video images from the vehicle environment;
at least one velocity sensor detecting the velocity of other vehicles in the vehicle environment;
a velocity sensor processing unit processing the velocity of the other vehicles relative to the detecting vehicle;
an image processing unit post-processing the video images and recognizing the other vehicles in the video images; and
a graphics processing unit visualizing the processed sensor data in the video images to visually alert the driver of the detecting vehicle, where, when the velocity sensor detects that the velocity of a vehicle moving in front of the detecting vehicle is lower than a predetermined threshold velocity, the graphics processor displays braking lights of the front vehicle in an activated state although not actually physically in the active state, where the activated brake lights could be present in another driving situation.

21. A system for displaying video images from a vehicle environment outside of a detecting vehicle, the system comprising:

an image sensor taking video images from the vehicle environment;
at least one velocity sensor detecting the velocity of other vehicles in the vehicle environment;
a velocity sensor processing unit processing the velocity of the other vehicles relative to the detecting vehicle;
an image processing unit post-processing the video images and recognizing the other vehicles in the video images; and
a graphics processing unit visualizing the processed sensor data in the video images to visually alert the driver of the detecting vehicle, where, when the velocity sensor detects that the velocity of a vehicle moving in front of the detecting vehicle is lower than a predetermined threshold velocity, the graphics processor adds flashing warning lights to the front vehicle in the displayed video images although the flashing warning lights are not physically in an active state in the recognized vehicle, where the flashing warning lights could be present in another driving situation.

22. A method for presenting video images from a vehicle environment outside of a detecting vehicle to a driver of the detecting vehicle, the method comprising:

taking a video image of the vehicle environment in front of the detecting vehicle;
recognizing a plurality of objects in the video image;
presenting the video image including the recognized objects on a display of the detecting vehicle;
detecting sensor data of the vehicle environment or the detecting vehicle itself by operating a sensor of the detecting vehicle;
based on the detected sensor data, determining whether one or more of the detected sensor data is to be selected for communication to the driver via the presented video image;
if it is determined that one or more of the detected sensor data is to be selected for communication to the driver to visually alert the driver of the detecting vehicle, changing the representation of one or more of the recognized objects in the video image to visualize the selected sensor data although the representation is physically different than the recognized object, where the representation of one or more of the recognized objects could be present in another driving situation.

23. The method of claim 22, where detecting sensor data includes detecting data selected from the group consisting of the velocity of the detecting vehicle, the position of the detecting vehicle, the velocity of another vehicle, the position of another vehicle or of one or more of the recognized objects, the distance from the detecting vehicle to another vehicle or to one or more of the recognized objects, a temperature of the vehicle environment, a moisture level of the vehicle environment, a visibility of the vehicle environment, and combinations of two or more of the foregoing.

24. The method of claim 22, where detecting sensor data includes operating a navigation unit of the detecting vehicle.

25. The method of claim 22, where detecting sensor data includes accessing digital map data.

26. The method of claim 22, where detecting sensor data includes determining the position of the detecting vehicle, and further including comparing the position of the detecting vehicle relative to one or more of the recognized objects, and where changing the representation of the one or more recognized objects is based on the relative position.

27. The method of claim 22, where changing the representation includes rendering the visualization of the one or more recognized objects such that the one or more recognized objects are presented in the video image more prominently than other objects presented in the video image.

28. The method of claim 22, where changing the representation includes adding an additional object to the displayed video image, and where the additional object is not actually present in the vehicle environment or not actually visible by the driver while viewing the vehicle environment from the detecting vehicle.

29. The method of claim 22, where changing the representation includes adding an element to one or more of the recognized objects presented in the video and where the element is not actually present in the vehicle environment or not actually visible by the driver while viewing the vehicle environment from the detecting vehicle.

30. The method of claim 22, where determining whether one or more of the detected sensor data is to be selected includes determining whether one or more of the detected sensor data falls outside of a predetermined value or range of values.

* * * * *